3,040,101
OXIDATION OF ALKYLBENZENES
Gilbert B. Luzader, South Charleston, W. Va., assignor to Union Carbide Corporation, a corporation of New York
No Drawing. Filed Dec. 18, 1959, Ser. No. 860,342
6 Claims. (Cl. 260—592)

This invention relates to the liquid-phase catalytic oxidation of alkyl substituted aromatic hydrocarbons. More particularly, this invention is directed to a process for the preparation of aryl alkyl ketones and aryl alkyl carbinols which comprises heating in the liquid phase above 100° C. alkylbenzenes containing at least one alkyl group of more than one carbon atom and oxygen in the presence of catalytic amounts of the combination of pyridines characterized by the general formula:

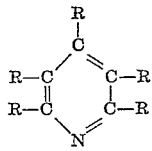

wherein each R, individually represents members selected from the group consisting of hydrogen and alkyl radicals, and a minor amount of an organic carboxylic acid salt of cobalt soluble in alkylbenzenes, selected from the group consisting of cobalt 2-ethylhexanoate, cobalt tallate and cobalt naphthenate.

It is known that products formed by the oxidation of alkylbenzenes are aryl alkyl ketones and aryl alkyl carbinols using various metal catalysts. For instance, in the oxidation of ethylbenzene, the principal products obtained are acetophenone, methyl phenyl carbinol, benzoic acid and organic residues. Of these products, acetophenone and methyl phenyl carbinol are of greater value than benzoic acid and it is desirable to use a process wherein the acetophenone and methyl phenyl carbinol are predominantly produced while producing, at most, only a small quantity of other products such as benzoic acid and organic residues. The known methods for the catalytic oxidation of ethylbenzene, use metallic catalysts which are generally insoluble in the reaction medium. The insoluble catalysts after a period of time, form sludges and deposits which tend to accumulate and plug the reactor used.

It is an object of this invention to provide a liquid-phase catalytic oxidation process for alkylbenzenes wherein aryl alkyl ketones and aryl alkyl carbinols are predominantly produced while producing, at most, only a small quantity of other products such as aryl alkyl acids and organic residues. Another object of this invention is to provide a liquid phase catalytic oxidation process for alkylbenzenes containing a catalyst system soluble within the reaction medium. A further object of this invention is the increase in production of methyl phenyl carbinol in the predominant production of acetophenone and methyl phenyl carbinol by the oxidation of ethylbenzene while producing, at most, only a small quantity of other materials such as benzoic acid and organic residues. These and other objects will readily become apparent to those skilled in the art in the light of the teachings herein set forth.

It has been discovered that the oxidation reaction of the alkylbenzenes in this invention is promoted by the presence of catalytic amounts of a co-catalyst system of pyridine and alkyl substituted pyridines in combination with a minor amount of an organic carboxylic acid salt of cobalt selected from the group consisting of cobalt 2-ethylhexanoate, cobalt tallate and cobalt naphthenate. The pyridine and alkyl substituted pyridines used in the co-catalyst system can be represented by the general formula:

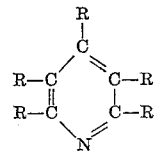

wherein each R, individually, represents members selected from the group consisting of hydrogen and alkyl radicals containing from 1 to 18 carbon atoms. Examples of the pyridine derivatives which can be used in this process include for example, pyridine, 2-methylpyridine, 3-methylpyridine, 4-methylpyridine, 2,4-dimethylpyridine, 2,6-dimethylpyridine, 2,4,6-trimethylpyridine, 2,4,5-trimethylpyridine, 2,3,4,5-tetramethylpyridine, 2-methyl-5-ethylpyridine, diethylpyridines, butylpyridines, octylpyridines and the like.

The process of this invention may be carried out in either batch or continuous types of operation although the latter is generally preferred. The hydrocarbon to be oxidized and the catalyst are brought together either in the form of a mixture or separately into a reaction vessel having a device for introducing oxygen as gases containing oxygen such as air into the vessel, preferably by passing the gas bubbles through the liquid. After the oxidation has progressed to the desired point, the resulting products are removed from the reactor system and isolated by fractional distillation.

The hydrocarbons suitable for oxidation in this invention are the mono-alkyl and di- and poly-alkylbenzenes. The preferred alkylbenzenes to be oxidized in this invention are the alkyl substituted benzenes containing two or more carbon atoms in the side chain. In the oxidation of the alkylbenzenes, the oxygen shows a specific affinity for the carbon atom attached to the benzene nucleus in the alpha position and attacks this carbon atom first, forming mixtures of carbinol and ketones. The product of oxidation, for example, in the case of ethyl benzene is a mixture of acetophenone and methyl phenyl carbinol. In an analogous way, oxidation takes place in the higher normal homologues of ethyl benzene such as n-propyl benzene, n-butyl benzene, n-hexyl benzene and the like. The homologues with a branched side chain such as isopropyl benzene partly lose one methyl group by oxidation. Besides the corresponding carbinol, a ketone with one carbon atom loss in the side chain is formed. Thus, in the case of isopropyl benzene, dimethyl phenyl carbinol and acetophenone are formed. Alkybenzenes containing more than one normal or secondary alkyl group may give rise to mixtures of products by oxidation of the different alkyl groups; the number of such products is, however, small since it is found that oxidation seldom or never takes place at more than one alkyl group in any particular molecule. Examples of hydrocarbons that can be oxidized in accordance with this invention are ethyl benzene, n-propyl benzene, isopropyl benzene, n-butyl benzene, n-amyl benzene, n-hexyl benzene, n-octyl benzene, 1,2-diethylbenzene, 1,3-diethylbenzene, 1-ethyl 4-isopropyl benzene and the like.

The oxidation process is carried out at a temperature above 100° C. preferably in the range of 100° C. to 150° C. depending upon the nature of the alkyl benzene charged to the process which is effected at a pressure of from substantially atmospheric to about 100 pounds per square inch, gauge. For convenience in operation, the process is preferably carried out at pressures of from about 30 to about 50 pounds per square inch, gauge. Oxygen is used as such as the oxidation is effected by means of air or a mixture of oxygen and an inert gas.

To obtain the best yields of aryl alkyl ketones and aryl alkyl carbinols it is desirable to stop the oxidation while at least half the starting material remains unoxidized and preferably while 75 percent or even more remains unoxidized. In general it is sufficient to allow the oxidation to proceed for about 5 minutes to 180 minutes, preferably for about 15 to 60 minutes, depending on the particular starting material and the other reaction conditions. The unoxidizide material is readily recovered by fractional distillation and may be again employed in the process of the invention.

The concentration of the co-catalyst used in this process can range from 0.3 to 2.5 percent by weight of the alkylbenzenes feed. The concentration of the pyridine and alkyl substituted position of the co-catalyst can range from 0.25 to 2.0 percent by weight of the alkylbenzene feed with a preferred range from 0.25 to 1.25 percent by weight. The minor amounts of the organic carboxylic acid salts of cobalt used in combination with the pyridine derivatives can range from as small as 0.001 percent to 0.3 percent by weight of the alkylbenzene feed.

The use of the co-catalyst system in this invention is highly advantageous since the co-catalyst is soluble in the reaction medium therefore eliminating heat exchange and emulsion problems. Furthermore, there is no deposit of solids on the surface of the reactor and no sludge in the oxidized product, thereby eliminating the necessity of frequent cleaning of the reactor and significantly increasing the capacity of production. The co-catalyst system used in this invention predominantly promotes the oxidation of alkylbenzenes, to the corresponding desired aryl alkyl ketones and aryl alkyl carbinols while producing, at most, only a small quantity of other undesirable products such as aryl alkyl acids and organic residues. In addition, the known insoluble metal catalyst used in the oxidation of alkylbenzenes such as ethylbenzene require initiators of the reaction such as dibenzoyl peroxide while the co-catalyst system of this invention requires no initiators to start the oxidation process.

The following examples will serve to illustrate the practice of the invention:

*Example I*

Four stainless steel tubular reactors are operated in series. Each reactor is fabricated of a 19-foot continuous coil of stainless steel pipe of 1-inch diameter enclosed in a jacket for heating and heat removal with steam. The reactor tubes are packed with ¼ x ¼ inch stainless steel perforated saddles for better contact between the air and the liquid. Thermometers are inserted in each reactor. Catalyst is fed with the ethylbenzene and air is added to the liquid under constant pressure at a point just ahead of the entrance to the first state.

To the initial reactor 2600 grams per hour of ethylbenzene and a mixture of 6.5 grams per hour of 2-methyl pyridine and 2.6 grams per hour cobaltous 2-ethyl hexanoate are charged. The reactor temperature is maintained at 135° C. and 50 pounds per square inch pressure. Air is provided at the rate of 20 cubic feet per hour. The ethylbenzene and air are fed at such a rate to maintain a conversion of 25 percent of the feed to methyl phenyl carbinol and acetophenone. After one hour of operation, steady conditions are attained. The following results are obtained in a 4 hour operation:

|  | Percent |
|---|---|
| Percent by weight of 2-methylpyridine in ethylbenzene feed | 0.25 |
| Percent by weight of cobaltous 2-ethylhexanoate in ethylbenzene feed | 0.125 |
| Percent by weight of ethylbenzene (of total oxidized) converted to— | |
| Acetophenone | 66.4 |
| Methyl phenyl carbinol | 22.7 |
| Benzoic acid | 5.8 |
| Residues | 0.7 |

*Example II*

Under the identical conditions of Example I, the following results were obtained in an 8 hour operation:
Percent by weight of ethylbenzene (of total oxidized) converted to—

|  | Percent |
|---|---|
| Acetophenone | 67.0 |
| Methyl phenyl carbinol | 24.3 |
| Benzoic acid | 6.1 |
| Residue | 1.4 |

*Example III*

Using the equipment described in Example I, to the initial reactor, 2600 grams per hour of ethylbenzene and a mixture of 52 grams per hour of 2-methyl pyridine and 6.5 grams per hour of cobaltous naphthenate are charged. The reactor temperature is maintained at 135° C. and 50 pounds per square inch pressure. Air is provided at the rate of 20 cubic feet per hour. The ethylbenzene and air are fed at such a rate as to maintain a conversion of 25 percent of the feed to methyl phenyl carbinol and acetophenone. After one hour of operation, steady conditions are attained. The following results are obtained:

|  | Percent |
|---|---|
| Percent by weight of 2-methylpyridine in ethylbenzene feed | 2.0 |
| Percent by weight of cobaltous naphthenate in ethylbenzene feed | 0.25 |
| Percent by weight of ethylbenzene (of total oxidized) converted to— | |
| Acetophenone | 80.4 |
| Methyl phenyl carbinol | 10.6 |
| Benzoic acid | 4.6 |
| Residues | 0.6 |

*Example IV*

Using the equipment described in Example I, to the initial reactor, 2600 grams per hour of ethylbenzene and a mixture of 26 grams per hour of 2-methyl pyridine and 6.5 grams per hour of cobaltous naphthenate are charged. The reactor temperature is maintained at 135° C. and 50 pounds per square inch pressure. Air is provided at such a rate to maintain a conversion of 25 percent of the feed to methyl phenyl carbinol and acetophenone. After one hour of operation steady conditions are attained. The following results are obtained:

|  | Percent |
|---|---|
| Percent by weight of 2-methyl pyridine in ethyl benzene feed | 1.0 |
| Percent by weight of cobaltous naphthenate in ethylbenzene feed | 0.25 |
| Percent by weight of ethylbenzene (of total oxidized) converted to— | |
| Acetophenone | 77.3 |
| Methyl phenyl carbinol | 12.1 |
| Benzoic acid | 4.6 |
| Residues | 0.6 |

*Example V*

A two-stage pot-type glass converter was provided for each stage with an agitator, thermometer, electric heating mantle, air feed diffuser in the bottom, ¼ x ¼ inch stainless-steel perforated saddles as bottom packing and a brine-cooled decanting head for removal of water and blow off gas. The flow of gas through the reactor was maintained by means of an air stream at a constant pressure. To the reactor 250 grams per hour ethylbenzene and 2.5 grams per hour 2-methyl pyridine were charged. The reactor was maintained at 125° C. and atmospheric pressure. Air was provided at the rate of 4 to 7 cubic feet per hour. The ethylbenzene and air were fed at such a rate to maintain a conversion of 25 percent of the feed to methyl phenyl carbinol and acetophenone. After 4 hours of operation, steady conditions were attained.

The following results were obtained in a 26 hour operation.

| | Percent |
|---|---|
| Percent by weight of 2-methyl pyridine in ethylbenzene feed | 1.1 |
| Percent by weight of ethylbenzene (of total oxidized) converted to— | |
| Acetophenone | 76.3 |
| Methyl phenyl carbinol | 9.8 |
| Benzoic acid | 3.5 |
| Residues | 7.8 |

The co-catalyst system of this invention promotes the oxidation of ethylbenzene to methyl phenyl carbinol at rates from 1.08 to 2.48 times higher than the use of a pyridine catalyst such as 2-methyl pyridine, alone. As is well known, in the production of styrene using the ethylbenzene oxidation procedure, acetophenone, an intermediate, is further hydrogenated to methyl phenyl carbinol followed by a dehydration process to obtain the styrene. It is therefore, highly desirable for styrene production, to reduce the production of acetophenone in the oxidation of ethylbenzene and at the same time increase the production of methyl phenyl carbinol while at the same time produce a minimum amount or no benzoic acid and organic residues.

Although the above examples all relate to the oxidation of ethylbenzene to give acetophenone with and without phenyl methyl carbinol, other alkyl benzenes may be oxidized to the corresponding ketones and carbinols under similar conditions. For example, n-propyl benzene may be oxidized to phenyl ethyl ketone and phenyl ethyl carbinol; isopropyl benzene may be oxidized to acetophenone and phenyl methyl carbinol; isopropyl toluene produces p-tolyl methyl ketone and carbinol and also p-isopropyl benzaldehyde. Alkylbenzenes in which no hydrogen atom is attached to the alkyl carbon atom adjacent to the aromatic ring appear not to be oxidized to ketones and carbinols under the conditions of this invention.

What is claimed is:

1. A process for the preparation of aryl alkyl ketones and aryl alkyl carbinols which comprises heating in the liquid phase above 100° C., alkylbenzenes containing at least one alkyl group of more than one carbon atom and oxygen in the presence of catalytic amounts of pyridines having the formula:

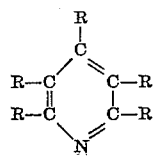

wherein each R, individually, represents members selected from the group consisting of hydrogen and alkyl radicals, and 0.001 percent to 0.3 percent by weight of the alkylbenzene of an organic carboxylic acid salt of cobalt selected from the group consisting of cobalt 2-ethylhexanoate, cobalt tallate and cobalt naphthenate.

2. The process of claim 1 wherein the temperature ranges from about 100° C. to about 150° C.

3. A process for the preparation of acetophenone and methyl phenyl carbinol which comprises heating in the liquid phase above 100° C. ethylbenzene and oxygen in the presence of catalytic amounts of pyridines having the formula:

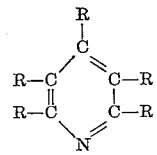

wherein each R, individually, represents members selected from the group consisting of hydrogen and alkyl radicals, and 0.001 percent to 0.3 percent by weight of the alkylbenzene of an organic carboxylic acid salt of cobalt selected from the group consisting of cobalt 2-ethylhexanoate, cobalt tallate, and cobalt naphthenate.

4. The process of claim 3 wherein the temperature ranges from about 100° C. to about 150° C.

5. A process for the preparation of acetophenone and methyl phenyl carbinol which comprises heating in the liquid phase in the temperature range from about 100° C. to 150° C., ethylbenzene and oxygen in the presence of catalytic amounts of 2-methyl pyridine and 0.001 percent to 0.3 percent by weight of the ethylbenzene of cobalt 2-ethyl hexanoate.

6. A process for the preparation of acetophenone and methyl phenyl carbinol which comprises heating in the liquid phase in the temperature range from about 100° C. to 150° C., ethylbenzene and oxygen in the presence of catalytic amounts of 2-methyl pyridine and 0.001 percent to 0.3 percent by weight of the ethylbenzene of cobaltous naphthenate.

References Cited in the file of this patent

UNITED STATES PATENTS

| 1,813,606 | Binapfl et al. | July 7, 1931 |
| 2,545,870 | Baker et al. | Mar. 20, 1951 |
| 2,734,086 | Goppel et al. | Feb. 7, 1956 |